March 15, 1932.  F. G. WALKER  1,849,259
VALVE
Filed Aug. 25, 1930  2 Sheets-Sheet 1
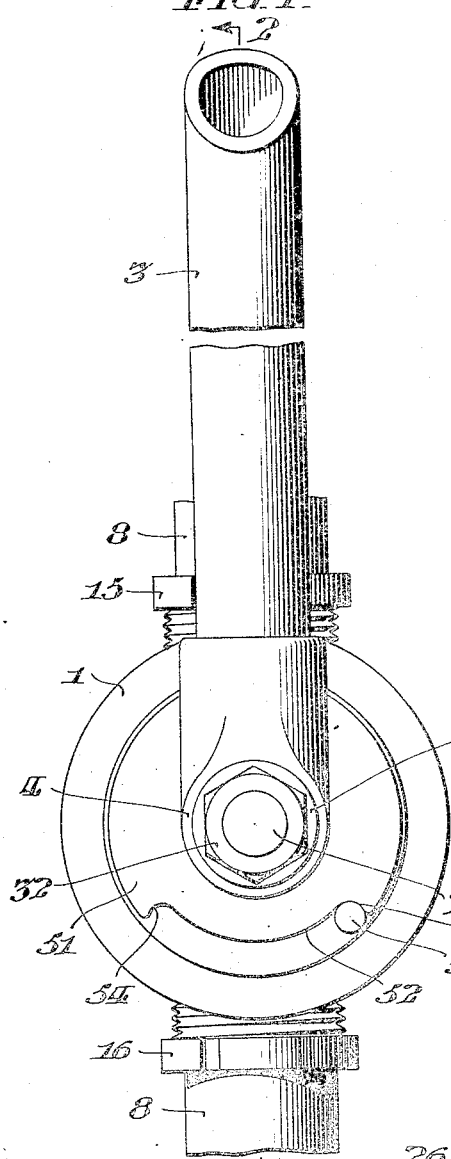
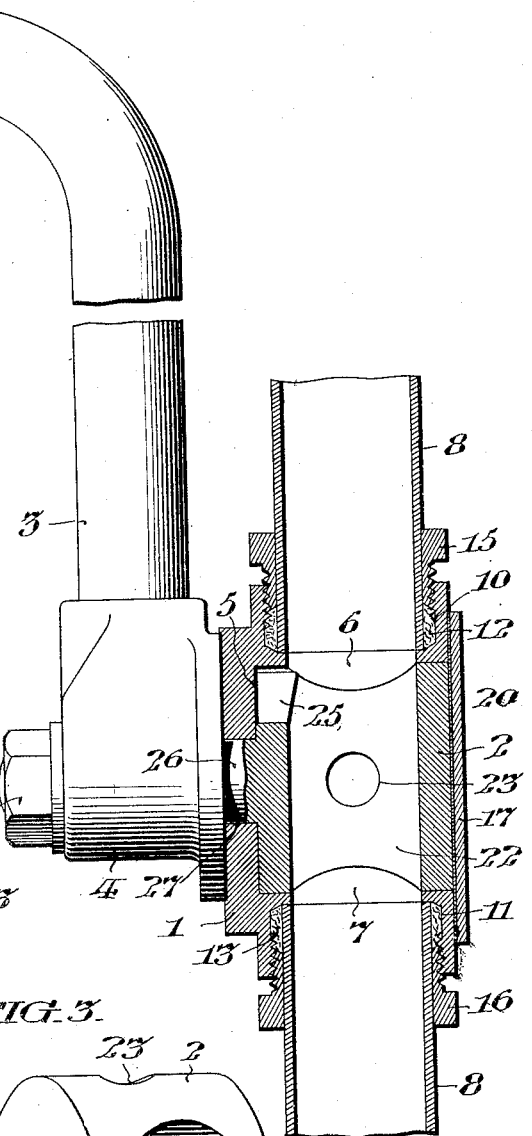
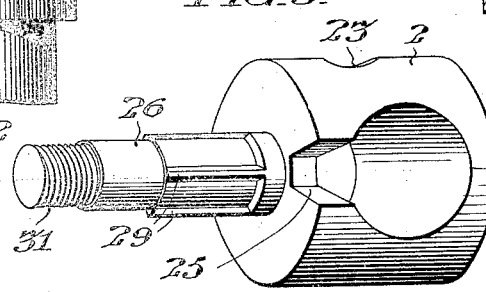
Inventor
Frank G. Walker;
By Clifton C. Hallowell
Attorney March 15, 1932.  F. G. WALKER  1,849,259
VALVE
Filed Aug. 25, 1930    2 Sheets-Sheet 2
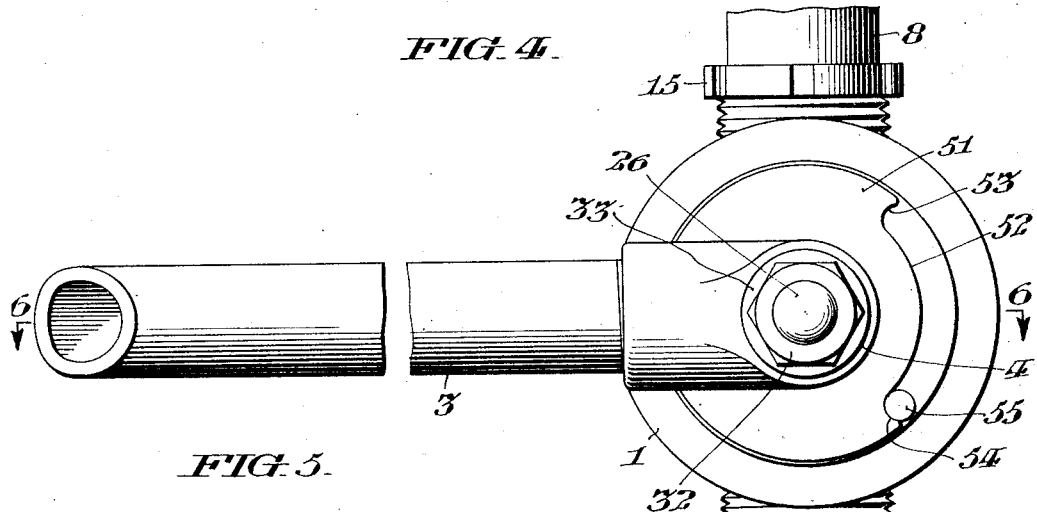
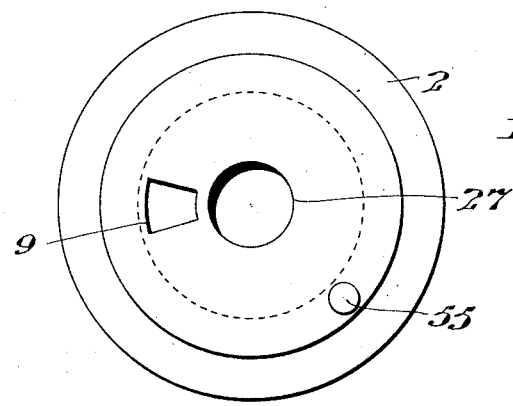
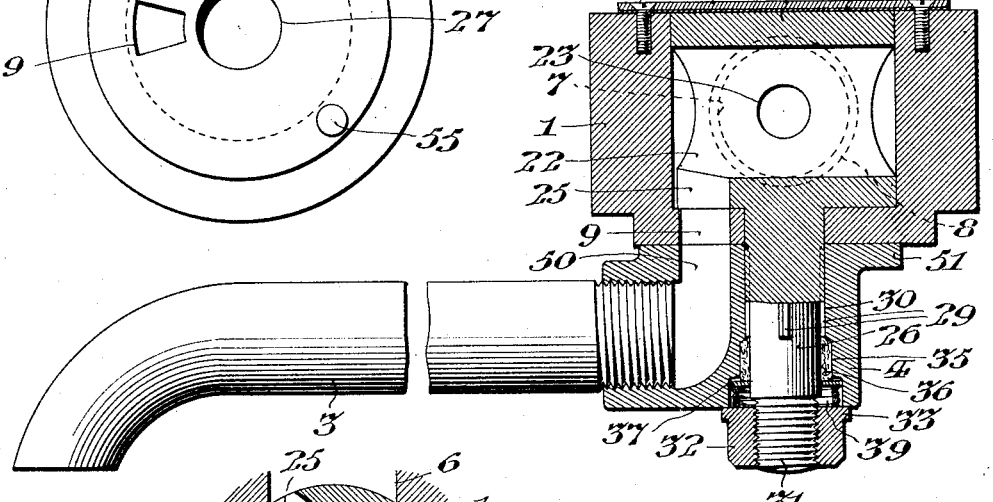
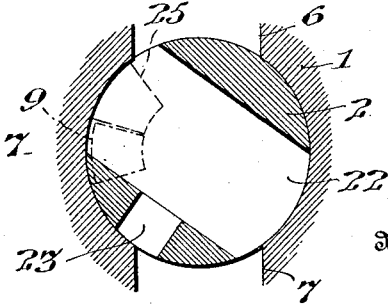
Inventor
Frank G. Walker,
By *Clifton C. Galloway*
Attorney Patented Mar. 15, 1932

1,849,259

UNITED STATES PATENT OFFICE

FRANK G. WALKER, OF SANTA BARBARA, CALIFORNIA

VALVE

Application filed August 25, 1930. Serial No. 477,645.

My invention relates particularly to that class of valves that are provided with a plurality of ports through which fluid may be received and selectively discharged and is especially directed to that type of multi-ported valves that are commonly designated as three-way-valves.

The principal objects of my invention are to provide a valve of such simplified construction as to be inexpensive to manufacture, and of such compact formation as to be light in weight and consequently tend to conserve space.

Other objects of my invention are to provide a valve having a tubular operating handle serving as a spout through which fluid passing through said valve may be discharged and directed to a suitable receiver, and which indicates by its position the direction of flow of fluid through said valve.

Further objects of my invention are to provide a valve affording an unobstructed linear path through which fluid may continuously flow, and having means by which said fluid may be diverted from said linear path and discharged through the tubular handle by the mere movement of said handle to its discharge position.

My invention includes a valve having relatively directed discharge ports in its casing respectively registerable with openings in the valve plug and so arranged that the flow through the valve is not interrupted by its change of direction.

Specifically stated, the form of my invention as hereinafter described comprehends a valve comprising a casing having an inlet port and relatively directed outlet ports, and a rotatable plug having openings therein registerable with said ports and having its stem provided with a tubular controlling handle affording a discharge spout and having a passageway arranged to register with one of said discharge ports when in its horizontal or discharge position.

My invention also includes all of the various novel features of construction and arrangement as hereinafter more definitely specified.

In the accompanying drawings, Figure 1 is a front elevational view of a three-way-valve constructed in accordance with my invention; Fig. 2 is a vertical longitudinal sectional view of the valve shown in Fig. 1 taken on the line 2—2 in said figure, the spout structure forming the handle being shown in elevation for convenience of illustration; Fig. 3 is a perspective view of the valve plug per se; Fig. 4 is a side elevational view of said valve showing the spout in position to discharge therethrough; Fig. 5 is a front elevational view of the valve body per se, the spout structure and pipe attaching glands being removed for convenience of illustration; Fig. 6 is a plan sectional view of said valve as shown in Fig. 4 taken on the line 6—6 in said figure, the spout forming the handle being shown in elevation for convenience of illustration; and Fig. 7 is a diagrammatic sectional view showing the relation of the valve plug-passages with respect to the ports in the valve body as said valve-plug moves from one position to another.

In said figures, the valve comprises the valve body 1, the plug 2, and the spout 3 having the hub 4 and serving as the handle by which the valve-plug may be operated and by which fluid passing through said valve may be diverted and discharged into any suitable receptacle when desired.

The valve 1 is generally cylindrical in form, having the plug socket 5 provided with the alined through ports 6 and 7 in its cylindrical wall and the discharge port 9 in its forward plane wall. The ports 6 and 7 open into the packing pockets 10 and 11 into which the opposed ends of the pipe line 8 extend. These pockets 10 and 11 are internally threaded and afford stuffing boxes for packing material 12 and 13 which may be compressed to form a fluid-tight joint by the respective glands 15 and 16.

The valve-plug 2 is rotatably retained in the socket 5 by the plug retaining plate 17 preferably in the form of a circular disk suitably held in position to close the valve body by the screws 19, with the packing washer 20 interposed between it and said plug to provide a leak-proof joint.

Said valve-plug 2 is provided with the transverse bore 22 arranged to axially aline with the ports 6 and 7 when the spout 3 forming the handle is in its vertical position, as shown in Fig. 2, so as to provide a straight uninterrupted flow of fluid passing therethrough.

The valve-plug 2 is also provided with the transversely extending aperture 23 whose axis intersects the axis of said bore 22 in substantially normal relation thereto, and has the sectoral aperture 25 communicating with the bore 22 and opening through the forward wall of said plug 2 so as to register with the port 9 when the plug 2 is turned to the position indicated in Fig. 6.

As best shown in Fig. 6, the valve-plug 2 has its stem 26 extended through the axially disposed aperture 27 in the outer wall of the valve body 1, said stem being provided with the ribs 29 which are cooperative with the corresponding grooves 30 in the hub 4 to prevent relative rotation, and also having the threaded free end 31 with which the retaining nut 32 is so engaged that its flange 33 bears upon said hub 4 with such force as to maintain the adjacent surfaces of the outer wall of the valve body and the plug 2 and hub 4 respectively in fluid-tight engagement.

Surrounding the stem 26 adjacent to its threaded end a pocket 35 is provided in the hub 4 arranged to receive packing 36 which is backed up by the washer 37 preferably formed of metal and forced inwardly by the spiral spring 39 interposed between it and the nut 32.

As best shown in Fig. 6, the spout 3 is in threaded engagement with the hub 4, and affords communication through the passageway 50 which may register with the port 9, and through said port 9, aperture 25, bore 22, aperture 23 and port 7 with the pipe 8 when said spout is turned to its horizontal position as indicated in said figure.

Referring to Figs. 1, 4 and 5, the flange 51 of the hub 4 has the sectoral recess 52, the ends of which serve as abutments 53 and 54 which respectively engage the abutment post 55 on the valve body 51 to limit the rotation of said valve-plug 2, so as to respectively direct the fluid passing therethrough in the straight unretarded path through the pipe line 8 or from the lower section of said pipe line through the discharge spout 3, as desired.

It may be here noted that the bore 22 and the aperture 23 are so proportioned and related that either one or the other or both at the same time are in direct communication with the port 7 at all times, so that excess pressure may not be so built up in the pipe line as to cause injury to the mechanism or to the power unit by which the fluid is forced therethrough; this is best illustrated in Fig. 7 wherein the bore 22 and the aperture 23 are both in communication with the port 7, and the sectoral aperture 25, indicated in dash lines, is just ready to form communication with the port 9 indicated in dot-and-dash lines, which condition will be effected by a slight anti-clockwise movement of the valve-plug 2, as will be obvious.

It will be observed that the discharge end of the spout 3 is curved laterally so that when in its horizontal position, as shown in Figs. 4 and 6, to discharge the fluid from the pipe-line 8, said fluid is directed therefrom substantially horizontal and will strike the bottom of the sink or receptacle in such a manner as to prevent splashing.

My invention is advantageous in that a valve of relatively light construction may be employed, which not only conserves space and weight, but by the novel arrangement of the hollow discharge handle the operations of shutting off the direct flow through the pipe line 8, and the discharge of the fluid into any suitable receptacle may be contemporaneously effected by a single movement of the operator's hand.

I do not desire to limit my invention to the precise details of construction and arrangement as herein set forth, as it is obvious that various modifications may be made therein without departing from the essential features of my invention as defined in the appended claims.

Having thus described my invention, I claim:

1. A valve having a casing provided with a plurality of ports, a plug having openings arranged to so register with said ports as to maintain a continuously open passageway irrespective of its position, and a tubular handle for said plug having a passageway registrable with one of said ports.

2. A valve having a casing provided with an inlet port and relatively directed outlet ports, a plug having openings arranged to selectively register with said ports, and a tubular handle for said plug having a passageway registrable with one of said outlet ports and communicating with said inlet through said plug in one position of said handle, and out of registry when in an alternate position.

3. A valve having a casing provided with a plurality of ports, a cylindrical plug having openings arranged to register with said ports and having a stem, and a tubular handle having a hub overlying one of said ports and arranged to normally close said last mentioned port and having a passageway arranged to register with this port when it is desired to discharge through said handle.

4. A valve having a casing comprising a cylindrical wall having alined ports and a plane wall having an exhaust port, a cylindrical plug having an opening extending transversely therethrough and arranged to register with said alined ports, said opening being extended through the end wall of said plug and registrable with the port in the plane wall of said casing, and a tubular handle for said plug having a passageway arranged to register with said exhaust port.

5. A valve having a casing provided with a plurality of ports, a valve-plug having a bore extending transverse therethrough and arranged to register with relatively alined ports in said casing and having an opening registrable with a laterally disposed port, and a spout forming a handle for said valve-plug and having a hub provided with a passageway connected with said spout and arranged to register with said laterally disposed port.

6. A valve having a casing provided with inlet and outlet ports, and an exhaust port, a valve-plug having a bore arranged to register with said inlet and outlet ports, and having an opening in communication with said bore arranged to register with said exhaust port, and a spout comprising a handle for said valve-plug and having a passageway in alinement with the opening in said valve-plug and arranged to contemporaneously register with said exhaust port.

7. A valve comprising a body provided with a circular socket having an end wall and having inlet and outlet ports in its circular wall and an exhaust port in its end wall, a valve-plug rotatable in said socket and having passageways therein respectively registrable with said ports, and a tubular handle having a passageway in alinement with one of the passageways in said valve-plug and arranged to be moved therewith into and out of registry with said exhaust port.

8. A valve comprising a body provided with a circular socket having an end wall and having inlet and outlet ports in its circular wall and an exhaust port in its end wall, a valve-plug rotatable in said socket and having passageways therein respectively registrable with said ports, a closure removably connected with said body and arranged to retain said valve-plug in said socket, and a tubular handle having its end deflected outwardly and having a passageway in alinement with one of the passageways in said valve-plug and arranged to be moved therewith into and out of registry with said exhaust port and when said handle is turned to register its passageway with said exhaust, its outwardly deflected end being in a position to discharge horizontally.

9. A valve comprising a body provided with a circular socket having an end wall and having inlet and outlet ports in its circular wall and an exhaust port in its end wall, a valve plug rotatable in said socket and having passageways therein respectively registrable with said ports, means arranged to retain said plug in said socket, a tubular handle provided with a hub having abutments and having a passageway in alinement with one of the passageways of said valve plug and arranged to be moved therewith into and out of registry with said exhaust port, and means on said body arranged to engage said abutments to limit the rotation of said plug in registry with said ports.

10. A valve comprising a body provided with a circular socket having an end wall and having inlet and outlet ports and an exhaust port, a valve plug rotatable in said socket and having a bore of equal diameter with said inlet and outlet ports arranged to be turned into alinement therewith to afford an uninterrupted passage thereto said plug having a recess opening into said bore and arranged to register with said exhaust port, and a hollow handle forming a spout arranged to communicate with said exhaust port when turned in position to discharge fluid from said valve.

In witness whereof, I have hereunto set my hand this 19th day of August, A. D. 1930.

FRANK G. WALKER.